(12) United States Patent
Vian et al.

(10) Patent No.: US 7,400,943 B2
(45) Date of Patent: Jul. 15, 2008

(54) METHODS AND SYSTEMS FOR ANALYZING ENGINE UNBALANCE CONDITIONS

(75) Inventors: John L. Vian, Renton, WA (US); Matt H. Travis, Fall City, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/708,208

(22) Filed: Feb. 20, 2007

(65) Prior Publication Data

US 2007/0272013 A1   Nov. 29, 2007

Related U.S. Application Data

(62) Division of application No. 10/750,294, filed on Dec. 30, 2003, now Pat. No. 7,321,809.

(51) Int. Cl.
    *G01M 1/38*   (2006.01)
(52) U.S. Cl. .......................... 700/279; 73/66; 700/280; 706/23
(58) Field of Classification Search ............... 73/66; 700/279, 280; 706/23
    See application file for complete search history.

(56) References Cited

U.S. PATENT DOCUMENTS

| | | | |
|---|---|---|---|
| 5,313,407 A | | 5/1994 | Tiernan et al. |
| 5,367,612 A | | 11/1994 | Bozich et al. |
| 5,426,720 A | | 6/1995 | Bozich et al. |
| 5,576,972 A | | 11/1996 | Harrison |
| 5,586,065 A | | 12/1996 | Travis |
| 5,675,497 A | * | 10/1997 | Petsche et al. ............... 702/182 |
| 5,854,993 A | | 12/1998 | Grichnik |
| 6,137,886 A | | 10/2000 | Shoureshi |
| 6,185,171 B1 | * | 2/2001 | Bassett et al. ............ 369/53.18 |
| 6,601,054 B1 | | 7/2003 | Lo et al. |
| 6,976,012 B1 | * | 12/2005 | Rising, III .................... 706/25 |
| 7,085,655 B2 | * | 8/2006 | Ferrer ......................... 702/35 |
| 2004/0249520 A1 | | 12/2004 | Maine |

OTHER PUBLICATIONS

Haiying Huang, John Vian, David Carlson, and Donald C. Wunsch; "Support Vector Machine Application to Inverse Models for Propulsion Vibration Diagnostics"; technical paper presented at Society of Photo-Optical Instrumentation Engineers (SPIE) Symposium on Aerospace/Defense Sensing, Simulation, and Controls; Orlando, Florida; Feb. 16, 2001.

(Continued)

*Primary Examiner*—Hezron E. Williams
*Assistant Examiner*—Samir M. Shah
(74) *Attorney, Agent, or Firm*—Robert R. Richardson, P.S.

(57) ABSTRACT

Methods and systems for analyzing engine unbalance conditions are disclosed. In one embodiment, a method includes receiving vibrational data from a plurality of locations distributed over an engine and a surrounding engine support structure, and inputting the vibrational data into a neural network inverse model. The neural network inverse model establishes a relationship between the vibrational data and an unbalance condition of the engine, and outputs diagnostic information indicating the unbalance condition of the engine. In a further embodiment, a method further includes subjecting the vibrational data to a Fast Fourier Transformation to extract a desired once per revolution vibrational data prior to input to the neural network inverse model.

14 Claims, 6 Drawing Sheets

OTHER PUBLICATIONS

Xiao Hu, John Vian, Jai Choi, David Carlson, and Donald C. Wunsch; "Propulsion Vibration Analysis Using Neural Network Inverse Modeling"; technical paper presented at 2002 World Congress on Computational Intelligence; Honolulu, Hawaii; May 12, 2002.

Xiao Hu, John Vian, Joseph R. Slepski, and Donald C. Wunsch; "Vibration Analysis Via Neural Network Inverse Models to Determine Aircraft Engine Unbalance Conditions"; technical paper presented at International Joint Conference on Neural Networks; Portland, Oregon; Apr. 18, 2003.

* cited by examiner

METHODS AND SYSTEMS FOR ANALYZING ENGINE UNBALANCE CONDITIONS

This application is a divisional application of U.S. patent application Ser. No. 10/750,294 filed Dec. 30, 2003 now U.S. Pat. No. 7,321,809.

FIELD OF THE INVENTION

The present disclosure relates to methods and systems for analyzing engine unbalance conditions, and more specifically, to neural network systems for analyzing linear and non-linear vibrational phenomena.

BACKGROUND OF THE INVENTION

Many types of industrial machines include rotating components that may suffer from unbalance conditions. During operation, such unbalance conditions may cause undesirable vibrational effects throughout the machine. For example, it is known that unbalance conditions in aircraft engines may result in unwanted acoustic noise and structural vibrations throughout the aircraft. It is therefore desirable to characterize and control unbalance conditions of rotating components of aircraft engines, as well as the unbalance conditions of the rotating components other types of industrial machines.

Considerable efforts have been devoted to the diagnosis and management of engine unbalance conditions. One conventional method practiced by engine manufacturers is to modify the locations where engine vibrations may be transferred to the aircraft structure in order to reduce structurally transmitted vibrations, including the installation and use of damped bearings and vibration isolators. Another conventional method is to regularly balance the rotating components of aircraft engines using weights at specific locations, similar to that common practice of balancing automotive wheels. Still other methods of diagnosing and managing engine unbalance conditions may involve computational analysis of vibrational data using software algorithms that strive to mathematically model and characterize such data. Such algorithms may then be used for the computational prediction and development of appropriate vibrational damping solutions (e.g. the selection and location of balancing weights). Such methods include, for example, those methods and systems disclosed in U.S. Pat. No. 6,027,239 issued to Ghassaei, U.S. Pat. No. 5,586,065 issued to Travis, U.S. Pat. No. 5,313,407 issued to Tiernan et al., and U.S. Pat. No. 5,172,325 issued to Heidari.

Although desirable results have been achieved using such prior art methods and systems, there is room for improvement. For example, one possible weakness of at least some prior art algorithms is that such algorithms employ linear equations to characterize the engine vibrational data, even though the vibrational data may include significant non-linear components. Possible sources of non-linear vibrational data in an aircraft may include engine rotor shaft coupling misalignments, imbalances in the compressor and turbine stages of the engine, squeeze film bearings, and inner shaft bearings that couple the high and low rotors, structural members and joints, attachment components, and other possible sources. Non-linear components of vibration from such sources may not be adequately modeled using prior art linear analysis methods.

Another possible drawback of most of the prior art methods and systems is that such methods typically strive to minimize the vibratory displacement of only a limited number of locations (commonly only two locations) on the aircraft engine. Even though the locations may be carefully chosen in an attempt to reflect the general condition of the aircraft engine, the practice of forcing only a limited number of locations to be at their lowest possible overall vibrational level does not guarantee that vibratory energy cannot flow into the wing and fuselage through other flow paths. Therefore, novel methods and systems for analyzing engine unbalance conditions that at least partially mitigate these adverse characteristics of the prior art methods would be useful.

SUMMARY OF THE INVENTION

The present invention is directed to methods and systems for analyzing engine unbalance conditions. Apparatus and methods in accordance with the present invention may advantageously provide improved characterization and diagnosis of engine vibrational data, particularly vibrational data including significant non-linear components, and particularly for applications where numerous alternate flow paths for vibrational energy may impart undesirable acoustic (cabin noise) or structural fatigue effects.

In one embodiment, a method of analyzing an engine unbalance condition includes receiving time domain vibration data from a plurality of locations distributed over at least one of an engine and/or a surrounding engine support structure, and inputting the vibrational data into a neural network inverse model. The neural network inverse model then establishes a relationship between the vibrational data from the plurality of locations and an unbalance condition of the engine, and outputs diagnostic information from the neural network inverse model, the diagnostic information indicating the unbalance condition of the engine. In a further embodiment, a method further includes subjecting the vibrational data to a Fast Fourier Transformation to extract a desired once per revolution vibrational data prior to input to the neural network inverse model. In another embodiment, a method includes preprocessing the vibrational data to transform it into wavelet basis functions to enhance extraction of meaningful vibration and acoustic noise features and relationships.

In a further embodiment, the vibration data is not used to 'balance' the engine by reducing the vibration transducer signatures to their lowest level, but is used instead to detect relationships between parameters that are related to energy transmission. As noted by Travis (U.S. Pat. No. 5,586,065), conventional balance methods do not always address the energy that can flow through alternative energy paths that are not represented by the accelerometer locations. The neural network approach can be used to detect parameter relationships that define new and non-obvious metrics for the energy transmission into the fuselage, metrics that provide more meaningful information than the arbitrarily low level of vibration sensors on the engine. Examples are: differences between vibration amplitudes fore and aft on the engine, phase angle differences between accelerometers, differences between vibration phasing from one engine to another, and combinations/permutations thereof.

In a further embodiment, the balancing of the engine can be performed using non-traditional input parameters such as cabin accelerometers, cabin microphones, and component structural fatigue measurements provided by accelerometers, with or without engine accelerometer data. As before, these data sets may be time domain or frequency domain inputs to the artificial neural network.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and systems for analyzing engine unbalance conditions, and more specifically, to neural network systems for analyzing linear and non-linear vibrational phenomena. Many specific details of certain embodiments of the invention are set forth in the following description and in FIGS. 1-7 to provide a thorough understanding of such embodiments. One skilled in the art, however, will understand that the present invention may have additional embodiments, or that the present invention may be practiced without several of the details described in the following description.

In brief, methods and systems in accordance with the present invention utilize equations based on the neural network approach to optimizing linear and nonlinear systems. Such methods and systems may be used to analyze sensor data and diagnose the unbalance state of an aircraft engine, to evaluate the practicality of the technology for engine balancing, and to evaluate the robustness of the approach when faced with nonlinearities which make present state of the art engine balancing techniques break down. Embodiments of methods and systems according to the present invention employ an inverse model that can analyze sensor data and diagnose the unbalance state of the engine. Several neural network methods, including multilayer perceptron (MLP) and support vector machines (SVMs), may be used in the inverse model. The methods to determine the inverse model design parameters, often referred to as "training", includes but is not limited to those commonly employed in the field such as back propagation, conjugate gradient, extended Kalman filter (EKF), and sequential minimal optimization.

Figure 1:
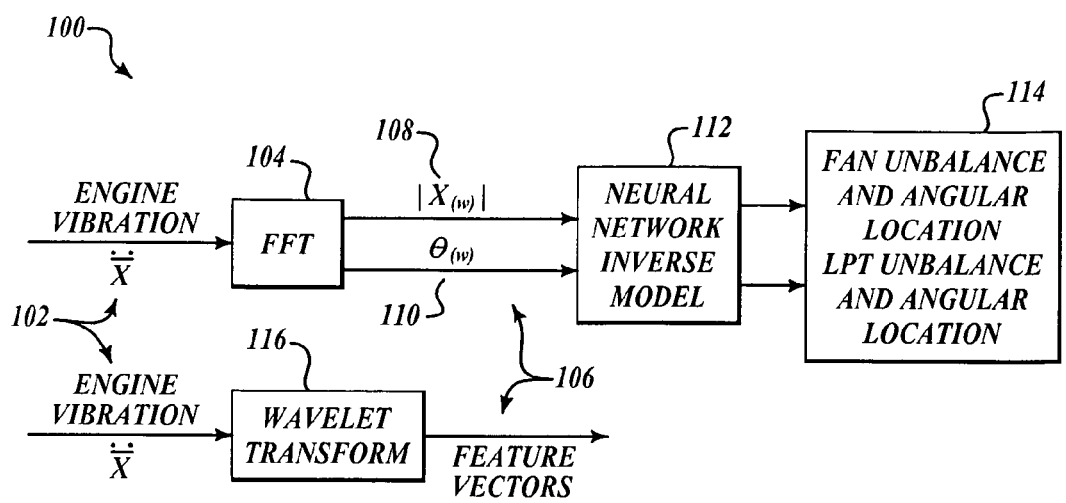
FIG. 1 is a flow chart of a method of analyzing an engine unbalance condition in accordance with an embodiment of the invention.

FIG. 1 is a flow chart of a method 100 of analyzing an engine unbalance condition in accordance with an embodiment of the invention. In this embodiment, the method 100 includes inputting raw vibrational data 102 which may be provided by sensors (e.g. accelerometers or microphones) mounted on portions of an aircraft engine or airframe structures. The raw vibrational data (or time domain data) are subjected to a Fast Fourier Transform (FFT) 104 which may extract the desired once per revolution vibrational data. The method 100 further includes outputting (or extracting) the FFT-processed vibrational data 106, preferably including a vibrational amplitude 108 at a specified engine rotational frequency 110. As further shown in FIG. 1, the FFT-processed vibrational data in complex form (amplitude and phase) are used as the input 106 into a neural network inverse model 112, which in turn outputs vibrational diagnostic information 114, as described more fully below. The vibrational diagnostic information may include fan unbalance and angular location data, low pressure turbine (LPT) unbalance and angular location data, and other diagnostic information.

In one aspect, the Fast Fourier Transform 104 may be performed using a technique known as order tracking. In brief, order tracking frames the FFT block size such that leakage effects may be reduced or eliminated and enabling the true once per revolution response amplitude at the engine rotation frequency to be extracted. All other spectral content (at other frequencies) may be discarded. Alternately, the time-domain data may transformed into other basis function spaces, such as Wavelets 116, to yield information contained in feature vectors, that are then used as the input 106 into a neural network inverse model 112. Alternately, the Fast Fourier Transform 104 or Wavelet Transform 116 may be eliminated, and the time-domain vibrational data 102 may be input directly into the neural network inverse model 112. The use of the raw time-domain data in conjunction with filtering, correlation, and order reduction methods commonly used in practice is a more general approach that does not presume periodicity and may be better suited for some engine balance applications.

Figure 2:
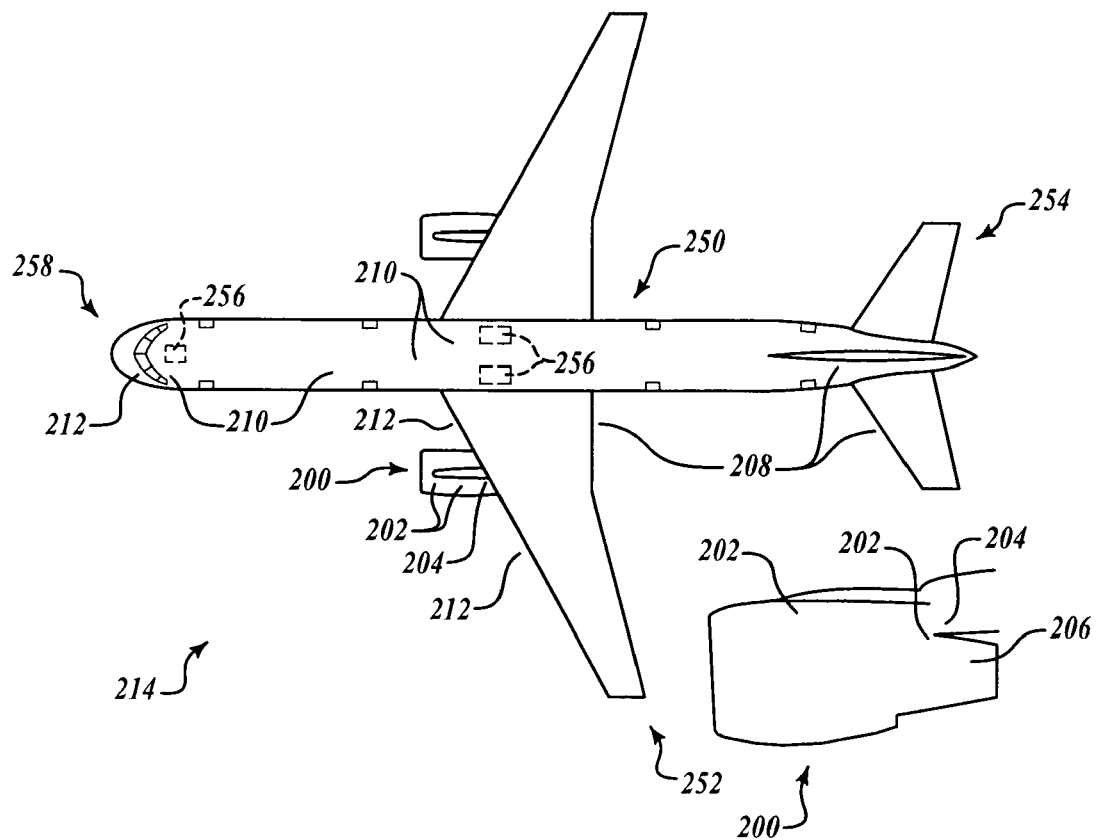
FIG. 2 is a side cross-sectional view of a representative aircraft engine and aircraft equipped with vibrational and acoustic sensors in accordance with an embodiment of the invention.

FIG. 2 shows a side cross-sectional view of a representative aircraft engine 200 equipped with vibrational sensors, including flange accelerometers 202, a strut accelerometer 204, and a tail cone accelerometer 206 used to obtain measurements affecting structural fatigue life. FIG. 2 also shows a cross-section of a representative aircraft frame 214 equipped with vibrational and acoustic sensors, including cabin and structure accelerometers 212, cabin noise acoustic sensors (typically microphones) 210, and surface accelerometers 208 used to obtain measurements affecting structural fatigue life. The aircraft 214 shown in FIG. 2 is generally representative of a commercial passenger aircraft, including, for example, the 737, 747, 757, 767, and 777 models commercially-available from The Boeing Company. The inventive apparatus and methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

As shown in FIG. 2, the aircraft 214 includes one or more engines (or propulsion units) 200 operatively coupled to a fuselage 250, wing assemblies 252 (or other lifting surfaces), a tail assembly 254, a landing assembly 256 (not visible), a control system 258 (not visible), and a host of other systems and subsystems that enable proper operation of the aircraft 214. In general, except for the vibrational monitoring system described more fully below, the various components and subsystems of the aircraft 214 may be of known construction and, for the sake of brevity, will not be described in detail herein.

Figure 3:
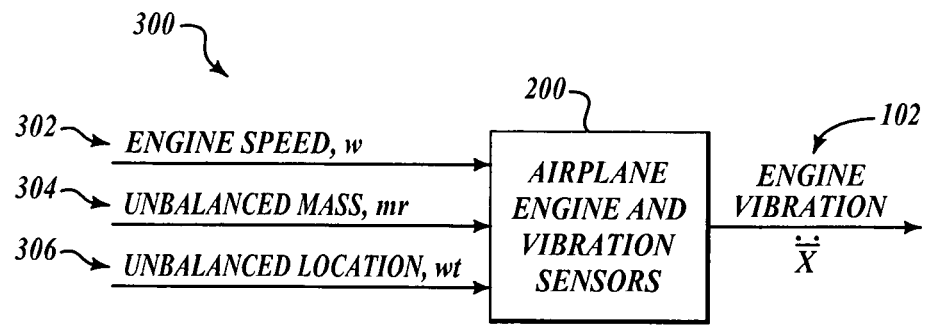
FIG. 3 is a schematic view of a set of possible input sources of engine vibrational data in accordance with a further embodiment of the invention.

FIG. 3 is a schematic view of a set of engine variables 300 that may impact the raw engine vibrational data 102 used by the method 100 (FIG. 1). As shown in FIG. 3, the engine variables 300 may include engine rotational speed w, unbalanced mass mr, and unbalanced location wt. The representative aircraft engine 200 (FIG. 2) may be operated at various operating conditions by adjusting the various engine variables 300, thereby providing the raw sensor data 102 that are input into methods in accordance with the present invention, including the embodiment (method 100) shown in FIG. 1.

Generally, at a given engine rotational speed w (or RPM), engine unbalances may produce a vibrational response at several sensor locations on the aircraft engine and surrounding structure. Methods in accordance with the present invention may include training the neural network inverse model 112 (FIG. 1) (e.g. using applied trial weights) until the model has established a mapping or correlation between applied engine unbalance and the measured responses of the engine. Since engine unbalance can vary in magnitude, angular location, and balance plane (e.g. of the fan or low pressure turbine), it is preferable to expose the model to responses from a variety of unbalance conditions. After training, the model may then be directly applied to subsequent engines for which a balance solution is sought, preferably with no further training required. Further accuracy of the model to match specific engine-airplane installations may be obtained by repeating the training process either on-board or off-board using data gathered during flight operations each time new balance weights are added to an engine.

In general, adequate training of the neural network inverse model 112 requires test data in the design stage of the condition monitoring system for training the model, as well as independent test data for validation of the model and overall method. Such data may be acquired by repeated trails in which experimental unbalance weights are deliberately placed on various components (e.g. the fan and low pressure turbine) of the engine at various angular locations and in varying amounts of unbalance weight, and is the preferred training method.

Since it may be unknown how much data is needed to adequately train the neural network model, and since large amounts of test data from a single engine with many unbalance weights applied may be unavailable, an alternate approach to using experimentally-generated training data is to develop an empirical engine-airframe to generate the required responses to unbalance inputs. Such empirical models may be created using limited test cases of actual jet engine unbalance conditions and experimentally observed responses of vibration at sensor locations, vibration at instrumented component locations, and/or acoustic noise levels at various locations. Using such an empirical model approach may provide a large amount of sufficiently accurate data for the purpose of this invention because the unbalance and responses relationship in the empirical engine model can be made to match exactly at the experimentally generated test points, and then transition continuously and smoothly between the test points, as would be expected based on the physical constraints of such a system. Other known methods of empirically modeling aircraft engines that may be suitable for evaluation of the effect of the deliberate introduction of varying degrees of system nonlinearity in a controlled manner include, for example, those methods disclosed in "Experience in Rotor Balancing of Large Commercial Jet Engines" authored by J. L. White, M. A. Heidari, and M. H. Travis, and published at SEM Proceedings of the 13$^{th}$ International Modal Analysis Conf., Vol. II, 1995, pp. 1338-1344, which publication is incorporated herein by reference.

For example, in one embodiment, an empirical engine may be created using an Influence Coefficient (IC) matrix approach from actual engine vibration test data. Using the IC approach, the vibration response of the engine to engine unbalance can be represented using the following complex matrix expression:

$$X(f) = R(f)F \quad (1)$$

Where $X(f)$=complex column vector of n sensor responses at a given engine frequency f $R(f)$=experimentally determined complex IC matrix of dimension n×2

F=complex unbalance vector that represents unbalances on the Fan and LPT

In one representative example, if two engine vibration sensors are employed, then n is equal to 2, and the IC matrix is a 2×2 matrix of complex numbers at any given frequency. Typically, a plurality of steady state engine RPM operating point frequencies (e.g. ten or more) for engine balancing over the climb and cruise range of the engine are employed. Preferably, the influence coefficients represent typical dynamic response characteristics in amplitude and phase versus engine RPM.

When balancing a jet engine on an aircraft, the amount of inherent or residual unbalance on the engine is the unknown property. Trial weights can be added to the engine, and the responses can be observed, but the forces acting on the engine to make those responses are unknown since they are a combination of applied and residual unbalances. Accordingly, during training of a neural network inverse model, an engine that has existing residual unbalances acting on it, as well as applied trial weight unbalances, may be employed. The neural network inverse model is not given information about the residual unbalance, and must establish the relationship between measured responses and trial weight unbalances only. The creation of an empirical engine with both residual and trial weights acting on it includes expanding the force column vector in Equation (1) above to consist of two column vector components, the residual unbalance, and the applied unbalance, that together create the net applied unbalance, as follows:

$$F_{net} = F_{residual} + F_{trial} \quad (2)$$

The above-referenced techniques may be incorporated into a process for training a neural network inverse model. In brief, the neural network inverse model may be trained by adjusting model parameters such that application of a set of inputs matches a desired set of outputs. One such training method is called the "back-propagation" algorithm. The back-propagation algorithm can train multi-layer feed-forward neural network inverse models with differentiable transfer functions to perform function approximation. Once the model has learned the engine behavior, whether it is linear or non-linear, any subsequent vibration data that is supplied to the model may characterize the state of residual unbalance on the engine, which may then be used to balance the engine.

Figure 4:
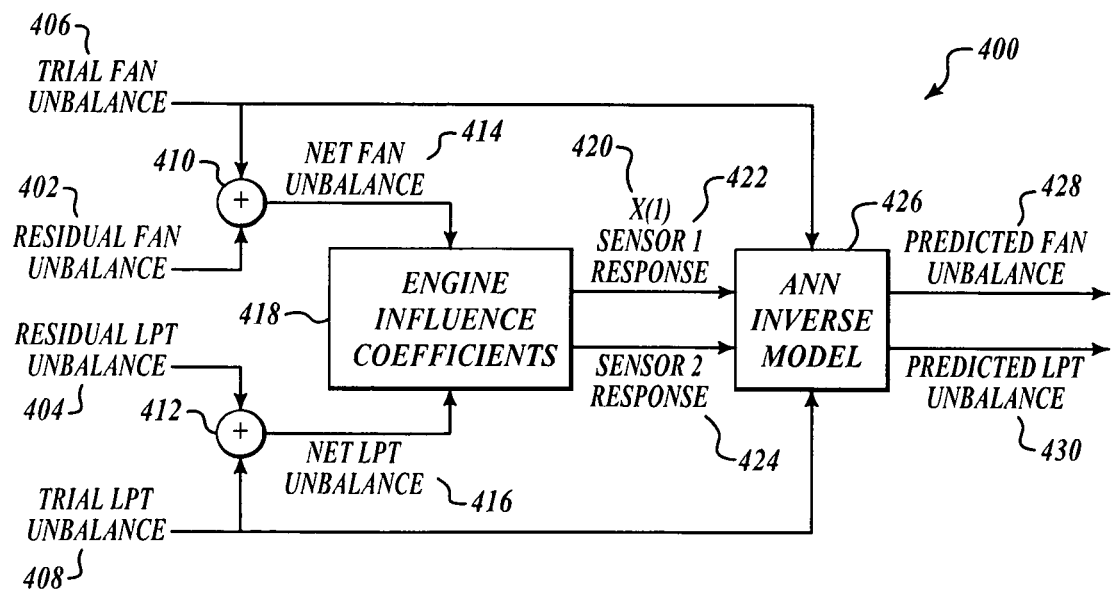
FIG. 4 is a schematic view of a process for evaluating and assessing performance of a neural network in accordance with another embodiment of the invention.

FIG. 4 is a schematic view of a process 400 for evaluating and assessing performance of a neural network inverse model in accordance with another embodiment of the invention. In this embodiment, the process 400 includes providing vibration data at a plurality of locations on the aircraft engine, specifically, at a fan vibration sensor 402 and a low pressure turbine sensor 404. Trial engine unbalance data are also provided, including trial fan unbalance data 406 and trial LPT unbalance data 408.

The input data (vibration data and trial unbalance data) are summed for the fan data 410 and for the LPT data 412, respectively, resulting in net fan unbalance data 414 and net LPT unbalance data 416. These net data 414, 416 are transmitted into an empirical engine module 418, such as an IC-based empirical model, which then combines these inputs with empirically-derived influence coefficients and outputs raw engine vibrational data 420, including raw engine vibrational data for the fan (or first) sensor 422 and the LPT (or second) sensor 424.

As further shown in FIG. 4, these raw engine vibrational data 422, 424 are then input into the neural network inverse model 426. The trial fan unbalance data 406 and the trial LPT unbalance data 408 are also provided to the neural network inverse model 426. As further shown in FIG. 4, the neural network inverse model then outputs predicted fan unbalance data 428 and predicted LPT unbalance data 430. These predicted unbalance data 428, 430 may then be analyzed and compared with anticipated or known outputs. Internal parameters of the neural network inverse model may then be adjusted, and the above-referenced acts of the process 400 shown in FIG. 4 may then be repeated to evaluate and assess the performance of the model.

The input to the neural network inverse model is vibration amplitude and phases of the two accelerometers (phase is relative to a once per revolution tachometer signal). The outputs of the neural network inverse model are unbalances on the shaft that it detects, which are also complex numbers in amplitude and angular orientation (angle relative to an index on the shaft). Since the input and output to the neural network inverse model are complex numbers, then the neural network inverse model itself is a complex mapping. In other words, the neural network inverse model is trained to establish the complex relationship between complex engine vibration response and complex unbalances acting on the engine at several locations.

A neural network inverse model may not be a generic model that can be applied to any subsequent engine with different residual unbalance. Typically, training the neural network inverse model using trial weights will establish a unique mapping that is biased by the residual engine unbalance that is present in the engine used to perform the training. There are, however, several analytical approaches to convert a uniquely trained neural network inverse model into a generic neural network inverse model that may be used for diagnosing other engines.

Generally, training of neural networks can be made more efficient if the data (both the network input and output) can be scaled beforehand. One approach for scaling network inputs and targets is to normalize the mean and standard deviation of the training set, which normalizes the inputs and targets so that they will have zero mean and unity standard deviation. If this preprocessing approach is employed for the training set data, then whenever the trained network is used with new inputs, such new inputs should be preprocessed with the same means and standard deviations that were computed for the training set. The outputs generated from these preprocessed inputs may also be converted back into the same units that were used for the original targets.

Figure 5:
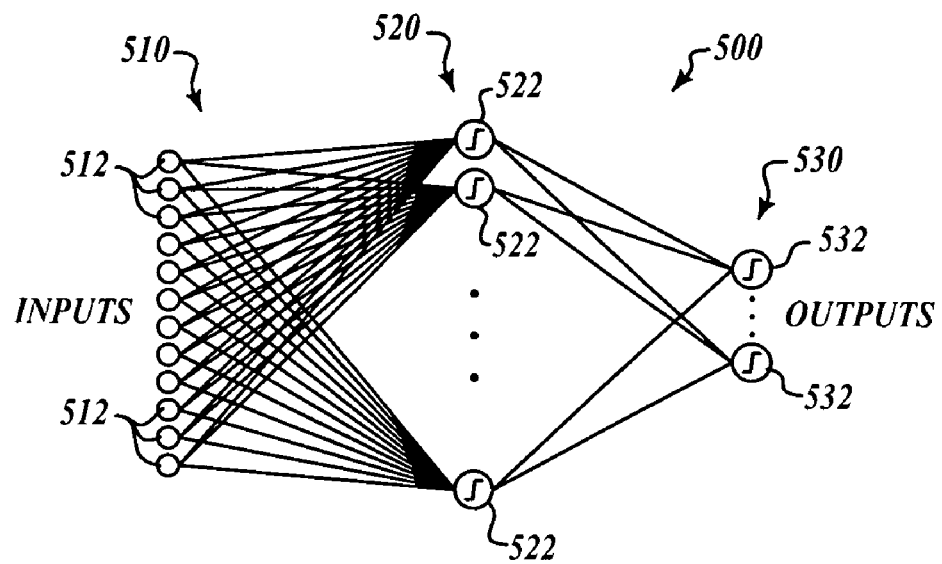
FIG. 5 is a schematic view of a typical multilayer perceptron neural network in accordance with yet another embodiment of the invention.
Figure 6:
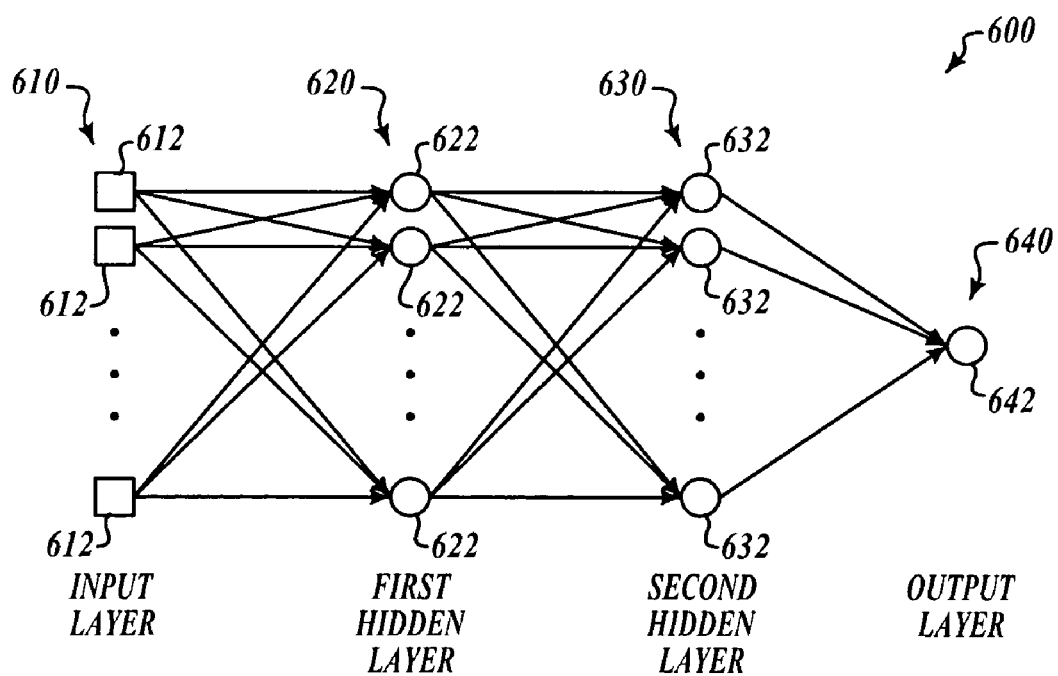
FIG. 6 is a schematic view of another multilayer perceptron neural network in accordance with another alternate embodiment of the invention.

Neural networks are generally known for their function approximation and pattern recognition performance. Several differing neural network approaches to the engine unbalance detection problem may be employed. For example, an approach known as backpropagation is the most common method used in the training of feedforward neural networks (also known as multilayer perceptron—MLP) with differentiable transfer functions. For example, FIG. 5 is a schematic view of a typical MLP neural network 500 in accordance with yet another embodiment of the invention. In this embodiment, the MLP neural network 500 includes an input layer 510 having a plurality of inputs 512, a first hidden layer 520 including a plurality of first differentiable transfer functions 522, and finally, an output layer 530 including a plurality of outputs 532. Similarly, FIG. 6 is a schematic view of an MLP neural network 600 in accordance with an alternate embodiment of the invention. In this embodiment, the MLP neural network 600 includes an input layer 610 having a plurality of inputs 612, a first hidden layer 620 including a plurality of first differentiable transfer functions 622, a second hidden layer 630 including a plurality of second differentiable transfer functions 632, and finally, an output layer 640 including a single output 642.

Another potential approach is an algorithm called extended Kalman filter (EKF) as disclosed, for example, in "Neurocontrol of nonlinear dynamical systems with Kalman filter trained recurrent networks" by G. V. Puskorius and L. A. Feldkamp (Neural Networks, IEEE Transactions on, vol. 5, pp. 279-297, Mar. 1994), and "Decoupled extended Kalman filter training of feedforward layered networks" by G. V. Puskorius and L. A. Feldkamp (Neural Networks, Proceedings of IJCNN-91-Seattle International Joint Conference on, vol. 1, pp. 771-777, 1991).

In one embodiment, a Node Decoupled Extended Kalman Filter (DEKF) may be employed as a natural simplification of the global extended Kalman algorithm (GEKF) by ignoring the interdependence of mutually exclusive groups of weights, thereby allowing the computational complexity of EKF to be adjusted to the low requirements of the computational resources (see "Node decoupled extended Kalman filter based learning algorithm for neural networks" by S. Murtuza and S. F. Chorian, Intelligent Control, Proceedings of the 1994 IEEE International Symposium on, pp. 364-369, 1994). Although the DEKF is always computationally less demanding than the GEKF, current computer speeds and memory sizes have now made the global EKF feasible for many practical problems. An advantage of the EKF approach over the Standard BackPropagation (SBP) approach is that, generally, EKF may often produce results comparable to SBP but with significantly fewer presentations of training data and less overall training epochs.

Given a network with M weights and $N_L$ output nodes, the weights update for a training instance at the time step n of GEKF is given by:

$$A(n) = [R(n) + H'(n)P(n)H(n)]^{-1}, \quad (3)$$

$$K(n) = P(n)H(n)A(n), \quad (4)$$

$$\hat{W}(n+1) = \hat{W}(n) + K(n)\xi(n), \quad (5)$$

$$P(n+1) = P(n) - K(n)H'(n)P(n) + Q(k), \quad (6)$$

$$P(0) = \frac{1}{\eta_p}I, \ R(n) = \eta_r I, \ Q(k) = \eta_q I. \quad (7)$$

In the above equations, R(n) is a diagonal $N_L$-by-$N_L$ matrix, whose diagonal components are equal to or slightly less than 1. H(n) is an M-by-$N_L$ matrix containing the partial derivatives of the output node signals with respect to the weights. P(n) is an M-by-M matrix defined as the approximate conditional error covariance matrix. A(n) is a $N_L$-by-$N_L$ matrix that we refer to as the global scaling matrix. K(n) is an M-by-$N_L$ matrix containing the Kalman gains for the weights. $\hat{W}(n)$ is a vector of length M containing all the weights values. $\xi(n)$ is the error vector of the network's output layer. Equation (6) uses artificial process noise to avoid numerical difficulties, and to significantly enhances the performance of the GEKF algorithms in terms of rate of convergence, avoidance of local minimum and quality of solution.

Another possible approach for the neural network inverse model is known as Support Vector Machines (SVMs) algorithms, as disclosed, for example, in "Support vector machines for classification and regression" by S. R. Gunn (Technical Report ISIS-1-98, Department of Electronics and Computer Science, University of Southampton, 1998), "A tutorial on support vector machines for pattern recognition" by C. Burges (Data Mining and Knowledge Discovery, 2(2): 121-167, 1998), "Libsvm: a library for support vector machines (version 2.3)" by C. Chang and C. Lin., and "Training feed-forward networks with the extended Kalman algorithm" by S. Singhal and L. Wu, (Proceedings of International Conference on Acoustics, Speech and Signal Processing (IC-ASSP-89), vol.2, pp. 1187-1190, 1989).

In one embodiment, a support vector machine problem may be given the training samples $\{(x_i, d_i)\}_{i=1}^{N}$, where $x_i$ is the input vector, $d_i$ is the corresponding target output, find the Lagrange multipliers $\{\alpha_i\}_{i=1}^{N}$ that maximize the objective function:

$$Q(\alpha) = \sum_{i=1}^{N} \alpha_i - \frac{1}{2} \sum_{i=1}^{N} \sum_{j=1}^{N} \alpha_i \alpha_j d_i d_j K(x_i, x_j) \tag{8}$$

subject to the following constraints:

$$\sum_{i=1}^{N} \alpha_i d_i = 0 \text{ and } 0 \leq \alpha_i \leq C, i = 1, 2, \ldots, N \tag{9}$$

where C is a user-specified parameter. The $K(x_i, x_j)$ is the kernel function which maps the multidimensional input space (nonlinearly separable patterns) into a new feature space with higher dimension where patterns are linearly separable. This optimization problem may be solved with quadratic programming to provide an optimized Lagrange multiplier. A weight vector may then be determined according to the following equation:

$$W_o = \sum_{i=1}^{N} \alpha_{o,i} d_i \varphi(x_i) \tag{10}$$

where $\phi(x_i)$ is the image induced in the feature space due to $x_i$. A support vector machine output y becomes $$y = \sum_{i=1}^{N} \alpha_i d_i \varphi^T(x) \varphi(x_i). \tag{11}$$

The SVM technique may be applied to solve this regression problem, which is support vector regression (SVR). Given the measurement from the sensors, SVM attempts to diagnose the mass imbalance on the engine.

A variety of metrics may be used to allow error to be quantified in order to evaluate the various analytical approaches to the neural network inverse models. For example, in one embodiment, the results of the residual unbalance estimates produced by the neural network inverse model may be compared to the known residual unbalances that had been applied to the IC engine model, and attempted to compute the error between them. But error in the vector unbalance estimates may be difficult to quantify, since errors can occur in both magnitude and angular orientation. For example, an estimate of 1 ounce inch at 0 degrees that should have been 1 ounce inch at 90 degrees is a large error in terms of the vector difference, but in terms of the effect on the engine response such an error could be small and in the noise level of the data.

Alternately, a potentially more useful and revealing metric for evaluating error may be to apply the neural network inverse model derived corrective balances to the original IC model as a trial weight, while retaining the original residual unbalances. By comparing the response of the IC engine with these corrective balance weights applied to the response without these weights, the net improvement can be established. If effective, the neural network inverse model solution should produce low or nearly zero vibration response magnitudes. Errors may produce less than ideal engine responses, and may make the vibration worse. Since the magnitudes of the vibration responses are typically of primary interest, then this method of error estimation may also be simpler to conduct.

Error detection on the validation set within the training itself may also be monitored during the training process. When the neural network begins to overfit the data, the error on the validation set will typically begin to rise. Thus, when the validation error increases for a specified number of iterations, the training may be stopped, and the network weights at the minimum of the validation error may be returned.

Figure 7A:
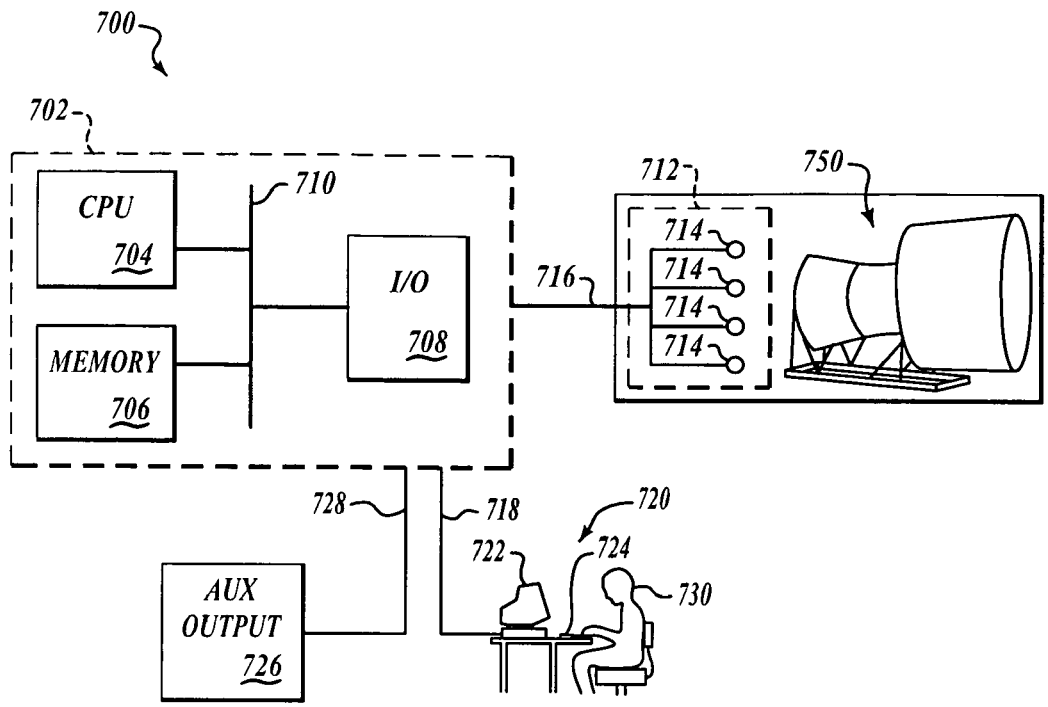
FIGS. 7A through 7C show representative systems for analyzing engine vibrational data in accordance with further embodiments of the present invention.

The above-described methods based on the neural network approach to optimizing linear and non-linear vibrational solutions may be embedded in an integrated engine balancing system that may include sensors, signal conditioning algorithms, engine balance software, and data and solution display devices. Such systems may be integrated in ground based engine test stands, self contained on-board aircraft systems, handheld portable maintenance systems, ground-based health management systems, or other architectural embodiments that permit the execution of the data analysis and extraction of information. For example, FIG. 7A is a representative system 700 for analyzing engine vibrational data in accordance with still another embodiment of the present invention. Unless otherwise specified below, the components of the system 700 are of generally-known construction, and will not be described in detail. For the sake of brevity, only significant details and aspects of the system 700 will be described. As shown in FIG. 7A, in this embodiment, the system 700 includes a computer 702 having a central processing unit (CPU) 704 and a memory component 706. The memory component 706 may include one or more memory modules, such as Random Access Memory (RAM) modules, Read Only Memory (ROM) modules, Dynamic Random Access Memory (DRAM) modules, and any other suitable memory modules. The computer 702 also includes an input/output (I/O) component 708 that may include a variety of known I/O devices, including network connections, video and graphics cards, disk drives or other computer-readable media drives, displays, or any other suitable I/O modules. A data bus 710 operatively couples the CPU 704, memory component 706, and the I/O component 708.

The system 700 embodiment shown in FIG. 7A further includes a data acquisition component 712 operatively coupled to the computer 702. In this embodiment, the data acquisition component 712 includes a plurality of data acquisition sensors 714 that may be arrayed on a test article 750

(e.g. FIG. 2) for the acquisition of mechanical vibrational data and acoustic noise data. The data acquisition component 712 is operatively coupled to the computer 702 via a communication link 716. The communications link 716 providing the means to communicate the vibrational and acoustic data in this embodiment may consist of one or more methods generally used in the practice such as data buses, wireless data link, magnetic computer media, optical computer media, and any other suitable means for transferring data from the test article to the processing computer 702.

As further shown in FIG. 7A, the system 700 further includes a control component 720 having a monitor 722 and a command input device 724 (e.g. a keyboard, an audio-visual input device, etc.). A second communication link 718 operatively couples the control component 720 to the computer 702. The system 700 also includes an auxiliary output device 726 coupled to the computer 702 by a third communication link 728. The auxiliary output device 726 may include a printer, a compact disk (CD) burner, a storage device, a communication port, or any other desired output device.

In one aspect, a machine-readable medium may be used to store a set of machine-readable instructions (e.g. a computer program) into the computer 702, wherein the machine-readable instructions embody a method of analyzing engine vibration data in accordance with the teachings of the present invention. The machine-readable medium may be any type of medium which can store data that is readable by the computer 702, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 700, including, for example, the I/O component 708, the memory component 706, and the auxiliary output device 726. Alternately, the machine-readable instructions may be implemented directly into one or more components of the computer 702, without the assistance of the machine-readable medium.

In operation, the computer 702 may be configured to perform one or more of the aspects of the methods of analyzing engine vibration data described above. For example, an operator 730 may input a command through the command input device 724 to cause the data acquisition component 712 to obtain raw engine vibrational data as described above with reference to FIGS. 1-3. The test data sets may then be communicated from the data acquisition component 712 to the computer 702. The computer 702 may be configured to perform the above-described methods of analyzing the vibrational data or training the neural network inverse model. For example, a set of software instructions may be stored in the computer 702 (e.g. in the memory component 706) that causes the raw engine vibrational data to be read into the memory component 706 and processed using the CPU 704 in accordance with the teachings herein, including one or more of the processes described above with respect to FIGS. 1-6. Alternately, one or more aspects of the various processes described above may be implemented in the computer 702 using any suitable programmable or semi-programmable hardware components (e.g. EPROM components).

Results of the analysis in accordance with one or more embodiments of the present invention may be transmitted via the data bus 710 to the I/O component 708. The results may also be transmitted to the control component 720 and to the auxiliary output device 726 via the second and third communications links 718 and 728. The operator 730 may view the results of the analysis method(s) on the control monitor 722, and may take appropriate action, including revising analysis parameters and inputs, and continuing or repeating the one or more embodiments of analysis methods using different test data as desired.

Figure 7B:
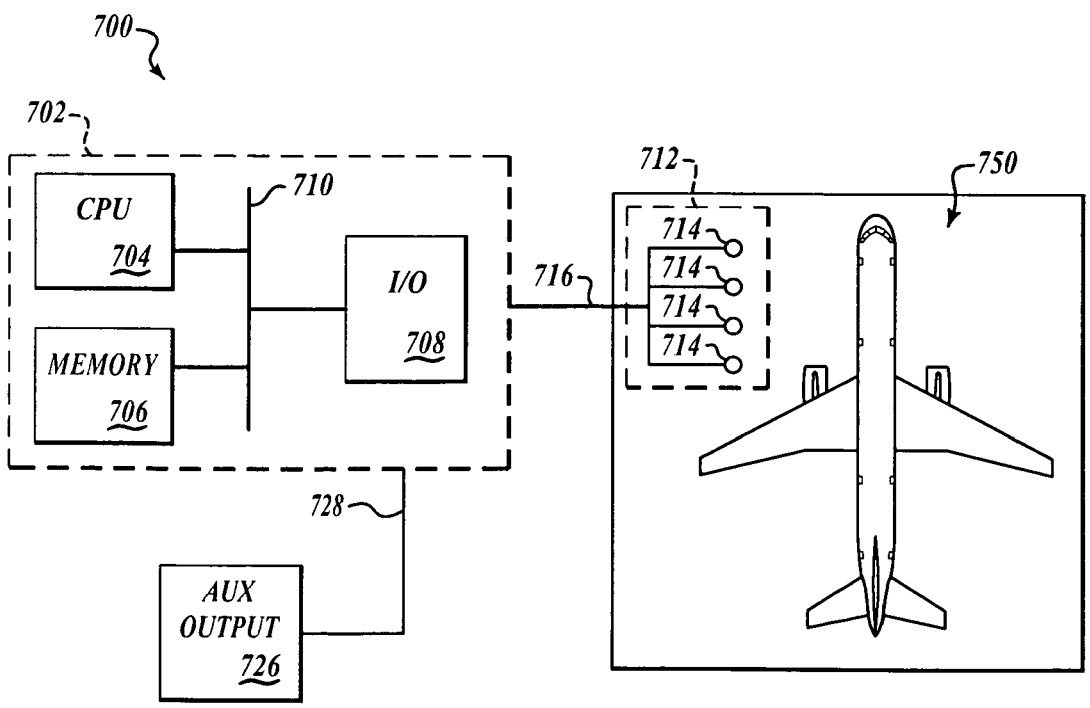

In yet another embodiment shown in FIG. 7B, the computer 702, data acquisition component 712, communications links 716 and 718, and auxiliary output device 726 are implemented within the test article environment 750, such as in the engine compartment or other on-board aircraft locations. The benefits of such an on-board implementation lies in the ability to provide timely engine unbalance information to aircraft operators and maintainers either on-board, or in the near vicinity of the aircraft, in addition to the afore described advantages of non-linear engine vibrational data analysis.

Figure 7C:
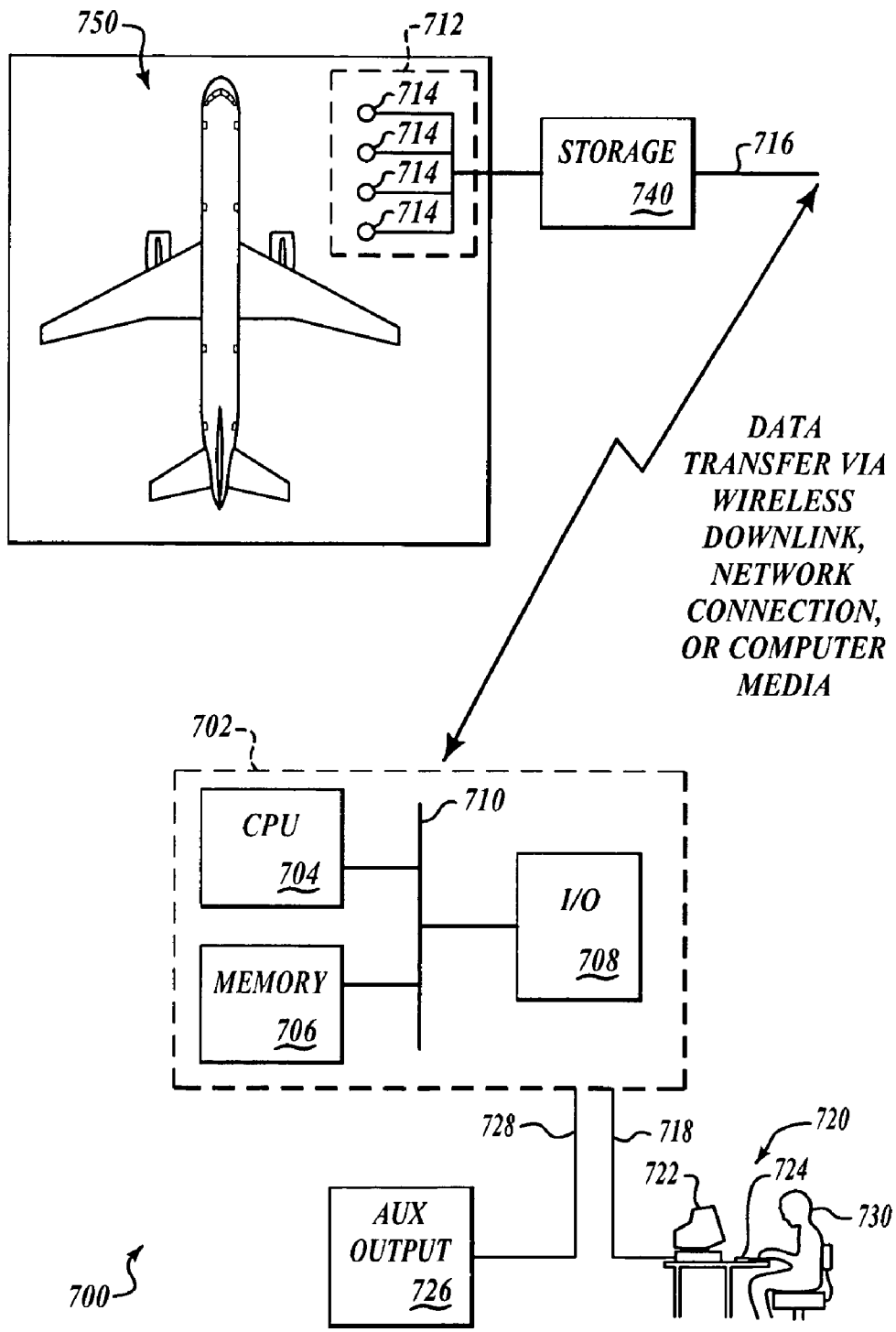

In yet another embodiment shown in FIG. 7C, the data acquisition component 712, a data storage device 740, and a communications link 716 are implemented within the test article environment 750, such as in the engine compartment or other on-board aircraft locations. The vibrational data and acoustic data are made available to the computer 702 via a communications link 716 commonly available in practice such as data buses, magnetic and optical computer media, wireless communication links, and satellite-based and cellular-based aircraft data downlink communication systems. The benefits of such an on-board data acquisition implementation lies in the ability to selectively acquire high quality operational test article data that will maximize the afore described advantages of non-linear vibrational data analysis, in addition to reducing the adverse effects of on-board computer weight and power supply in comparison with the prior art methods.

Methods and systems for analyzing engine unbalance conditions may provide significant advantages over the prior art. For example, embodiments of methods including neural network inverse models in accordance with the present invention may provide improved characterization and diagnosis of engine vibrational data and acoustic noise data, particularly data including significant non-linear components. Since neural network inverse models are equally applicable to both linear and non-linear vibrational problems, methods and systems incorporating such models are better equipped to analyze vibrational data including non-linear components. Furthermore, embodiments of methods and systems in accordance with the invention may provide improved engine balance solutions in comparison with the prior art methods that target the reduction of vibrational displacement at only two locations, particularly for applications where numerous alternate flow paths for vibrational energy may be significant.

It should be noted that the construction of an artificial neural network using back-propagation uses "input" and "output" terminology that are the reverse of what would be viewed as input and output from an overall process. To be more precise, when using back-propagation, the vibration data from the sensors is the output to the artificial neural network, and the input is the unbalance. The desired solution, in this case the unbalance magnitudes and angular locations, are back propagated, or solved for. This terminology is consistent with the concept of neurons and how neurons interact in a downstream sense. However, if one places a control volume around the entire process of acquiring data, supplying it to a neural network, and extracting useful information, the vibration data is the input to the control volume, and the output is the unbalance information. This distinction is drawn so as to establish more precise terminology for the claims, where an artificial neural network control volume, or ANNCV, shall refer to the entire data processing package control volume, irrespective of back-propagation or some other method of internal solution. The ANNCV shall be inclusive and independent of whether inverse back propagation models, Kalman filter Models, or Support Vector Machine models are used.

While preferred and alternate embodiments of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for analyzing an engine unbalance condition, comprising:
    a control component;
    an input/output device adapted to receive vibrational data; and
    a processor arranged to analyze the vibrational data, the processor including:
        a first portion adapted to receive vibrational data from a plurality of locations distributed over at least one of an engine and surrounding engine support structure;
        a second portion adapted to input the vibrational data into a neural network inverse model;
        a third portion adapted to establish a relationship between the vibrational data from the plurality of locations and the engine unbalance condition using the neural network inverse model; and
        a fourth portion adapted to output diagnostic information from the neural network inverse model, wherein the diagnostic information indicates at least one of the engine unbalance condition and information indicating the quantity and position of corrective engine balance weights needed to achieve desirable vibrational characteristics at the plurality of locations, and wherein the diagnostic information includes an unbalance magnitude and an angular location as a function of a rotational frequency of the engine.

2. The system of claim 1, wherein the second portion is adapted to input the vibrational data in a time domain format into a neural network inverse model.

3. The system of claim 1, wherein the second portion is adapted to input the vibrational data in a complex domain format into a neural network inverse model.

4. The system of claim 1, wherein at least one of the first, second, and third portions is adapted to subject the vibrational data to a Fast Fourier Transformation.

5. The system of claim 1, wherein at least one of the first, second, and third portions is adapted to extract a desired once per revolution vibrational data.

6. The system of claim 1, wherein at least one of the first, second, and third portions is adapted to subject the vibrational data to a Wavelet Transformation.

7. The system of claim 1, wherein the third portion is adapted to establish a relationship between the vibrational data from the plurality of locations and an unbalance condition of the engine using at least one of a multilayer perceptron neural network model, and a support vector machine neural network model.

8. The system of claim 1, wherein the third portion is adapted to establish a relationship between the vibrational data from a plurality of locations within one defined area to that of a plurality of locations within another defined area using at least one of a multilayer perceptron neural network model and a support vector machine neural network model.

9. The system of claim 1, wherein the third portion is adapted to be trained including adjusting model parameters such that application of a set of inputs and outputs reaches a desired state of definition defined by acceptable error tolerances.

10. The system of claim 1, wherein the third portion is adapted to be trained including using vibrational data generated using an engine that is subject to at least one of residual unbalances and applied trial weight unbalances.

11. The system of claim 1, wherein the third portion is adapted to be trained including scaling the vibrational training data prior to inputting into the neural network inverse model.

12. The system of claim 1, further including a memory component operatively coupled to at least one of the control component, the input/output device, and the processor.

13. The system of claim 1, further including a data acquisition component operatively coupled to at least one of the control component, the input/output device, and the processor.

14. The system of claim 13, wherein the data acquisition component includes a plurality of data acquisition sensors.

* * * * *